(12) United States Patent
Kitamoto et al.

(10) Patent No.: US 11,155,924 B2
(45) Date of Patent: Oct. 26, 2021

(54) SILVER MIRROR FILM, DECORATIVE ARTICLE, SILVER MIRROR FILM-FORMING LIQUID, AND METHOD FOR PRODUCING REDUCING LIQUID THEREFOR

(71) Applicant: TOYODA GOSEI CO., LTD., Kiyosu (JP)

(72) Inventors: Miki Kitamoto, Kiyosu (JP); Shintarou Okawa, Kiyosu (JP); Hiroaki Ando, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 81 days.

(21) Appl. No.: 16/345,859

(22) PCT Filed: Nov. 22, 2017

(86) PCT No.: PCT/JP2017/042093
§ 371 (c)(1),
(2) Date: Apr. 29, 2019

(87) PCT Pub. No.: WO2018/179579
PCT Pub. Date: Oct. 4, 2018

(65) Prior Publication Data
US 2020/0157685 A1 May 21, 2020

(30) Foreign Application Priority Data
Mar. 31, 2017 (JP) .............................. JP2017-070276

(51) Int. Cl.
*C23C 18/44* (2006.01)
*C23C 18/16* (2006.01)
(Continued)

(52) U.S. Cl.
CPC .......... *C23C 18/44* (2013.01); *C23C 18/1204* (2013.01); *C23C 18/165* (2013.01);
(Continued)

(58) Field of Classification Search
None
See application file for complete search history.

(56) References Cited

U.S. PATENT DOCUMENTS

| | | | |
|---|---|---|---|
| 2015/0034883 A1* | 2/2015 | Hirata ................. | B22F 1/0014 252/514 |
| 2016/0114397 A1* | 4/2016 | Ziebarth ................. | B22F 9/24 75/370 |
| 2016/0250612 A1* | 9/2016 | Oldenburg ............... | B01J 13/20 428/404 |

FOREIGN PATENT DOCUMENTS

| | | |
|---|---|---|
| JP | 2006-274400 A | 10/2006 |
| JP | 2007-321189 A | 12/2007 |

(Continued)

OTHER PUBLICATIONS

International Preliminary Report on Patentability of the International Searching Authority dated Oct. 10, 2019 for the corresponding international application No. PCT/JP2017/042093 (and English translation).

(Continued)

*Primary Examiner* — Xiaobei Wang
(74) *Attorney, Agent, or Firm* — Posz Law Group, PLC

(57) ABSTRACT

A silver mirror film includes a plurality of silver particles arranged in a film surface direction, a plurality of interparticle silicon particles between the silver particles, and a plurality of surface silicon particles on surfaces of the silver particles so as to at least partially cover the surfaces. The interparticle silicon particles and the surface silicon particles are present as $(Si_xO_{2y})_n\{x \geq 1, y \geq 1, \text{ and } n \geq 1\}$.

5 Claims, 6 Drawing Sheets

(51) Int. Cl.
    *C23C 18/54* (2006.01)
    *C23C 18/12* (2006.01)
    *C23C 18/31* (2006.01)
(52) U.S. Cl.
    CPC .......... *C23C 18/54* (2013.01); *C23C 18/1639* (2013.01); *C23C 18/31* (2013.01)

(56) References Cited

FOREIGN PATENT DOCUMENTS

| | | |
|---|---|---|
| JP | 4023368 B2 | 12/2007 |
| JP | 4140368 B2 | 8/2008 |
| JP | 2010-107854 A | 5/2010 |
| JP | 2014-139291 A | 7/2014 |
| JP | 5610359 B2 | 10/2014 |
| WO | 2007/138795 A1 | 12/2007 |

OTHER PUBLICATIONS

International Search Report of the International Searching Authority dated Jan. 23, 2018 for the corresponding international application No. PCT/JP2017/042093 (and English translation).

* cited by examiner

SILVER MIRROR FILM, DECORATIVE ARTICLE, SILVER MIRROR FILM-FORMING LIQUID, AND METHOD FOR PRODUCING REDUCING LIQUID THEREFOR

CROSS REFERENCE TO RELATED APPLICATIONS

This application is a U.S. national stage of International Application No. PCT/JP2017/042093 filed on Nov. 22, 2017 and is based on Japanese Patent Application No. 2017-070276 filed on Mar. 31, 2017, the contents of which are incorporated herein by reference.

TECHNICAL FIELD

The present invention relates to a silver mirror film, a decorative article, and a silver mirror film-forming liquid.

BACKGROUND

A typical method for imparting metallic luster to a surface of a substrate with no or poor metallic luster includes a method for forming a metal plating film and a method for forming a silver mirror film. In general, a metal plating film has advantages such as high discoloration resistance. However, the metal plating film is hardly formed on a surface of a three-dimensional shaped substrate so as to have uniform thickness. On the other hand, a silver mirror film has advantages such as being able to be formed on a surface of a three-dimensional shaped substrate so as to have uniform thickness, but has disadvantages such as low discoloration resistance.

In recent years, a three-dimensional shaped article with a deep concave has been more often used for exterior resin parts such as radiator grills of automobiles to enhance design property. For a three-dimensional shaped resin part for which a metal plating film is not appropriate, use of a silver mirror film comes into consideration. Therefore, improvement of discoloration resistance of a silver mirror film is required.

A silver mirror film densely includes many fine silver particles. In a method for forming the silver mirror film, a silver mirror film-forming liquid including a silver mirror liquid and a reducing liquid is applied immediately after mixing the silver mirror liquid and the reducing liquid, and a silver mirror reaction (reduction) occurs to deposit silver particles (Patent Document 1). The silver mirror film commonly appears to be a silver mirror from the outside. The silver mirror film also appears to be a mirror with plasmon coloring from the outside. The plasmon coloring is a phenomenon where plasmon resonance occurs between nano-sized silver particles and visible light having a specific wavelength at an interface between the silver particles and a dielectric material, the silver particles absorb only the visible light having a specific wavelength, and as a result, only the visible light having a specific wavelength is removed from white light to develop color. A conventional plasmon coloring procedure in a silver mirror film is only a sulfuration treatment using immersion.

The discoloration resistance of a silver mirror film is low. This is because of migration of silver particles forming the silver mirror film (a phenomenon in which the silver particles move on a substrate or an undercoat layer on the substrate) and aggregate to change the particle diameter, and thus silver itself is discolored. In a case of the silver mirror film with plasmon coloring, plasmon coloring may be deteriorated.

A method in which elements different from silver, such as gold and bismuth, are added to silver to produce an alloy in sputtering, and the alloy inhibits deposition of silver to make silver particles finer is known. The inventors of the present invention have investigated whether this method can be used in silver mirror coating. However, migration of silver particles cannot be suppressed by this method alone and discoloration resistance is slightly improved.

Patent Document 2 discloses a method in which nano-silica is added to a silver mirror film-forming liquid to adjust the particle size of silver particles. However, an object of this method is to form a silver mirror film layer having a uniform thickness and high reflectance at low temperature, but not to improve discoloration resistance.

PATENT DOCUMENTS

Patent Document 1: Japanese Patent No. 4140368
Patent Document 2: Japanese Patent Application Publication No. 2014-139291

SUMMARY

An object of the present invention is to improve the discoloration resistance of a silver mirror film. Another object of the present invention is to form a silver mirror film with plasmon coloring simultaneously with formation of a silver mirror film without a sulfuration treatment.

(1) Silver Mirror Film

A silver mirror film includes a plurality of silver particles arranged in a film surface direction, a plurality of interparticle silicon particles between the silver particles, and a plurality of surface silicon particles on surfaces of the silver particles so as to at least partially cover the surfaces.

For example, the interparticle silicon particles and the surface silicon particles are present as $(Si_xO_{2y})_n \{x \geq 1, y \geq 1, \text{ and } n \geq 1\}$.

<Action>

(a) The plurality of interparticle silicon particles between the silver particles suppress migration of the silver particles after formation of the silver mirror film and aggregation owing thereto, and thus the discoloration resistance is improved.

(b) The plurality of surface silicon particles on the surfaces of the silver particles so as to at least partially cover the surfaces also prevent migration of the silver particles after formation of the silver mirror film and aggregation owing to it, and thus the discoloration resistance is improved.

(c) When the amount of the surface silicon particles is controlled, plasmon resonance occurs between the silver particles and visible light having a specific wavelength at an interface between the silver particles and the surface silicon particles, and plasmon coloring is caused.

(2) Decorative Article

A decorative article includes a substrate, the silver mirror film (1) formed on the substrate, and a top coat layer formed on the silver mirror film.

The decorative article may include an undercoat layer between the substrate and the silver mirror film.

The decorative article may include another layer between the substrate and the top coat layer.

Examples of a material for the substrate include, but are not particularly limited to, resins, glasses, ceramics, and wood.

Examples of application of the decorative article include, but are not particularly limited to, exterior parts such as a radiator grill, an emblem, and a wheel cap, and interior parts such as a register and a scuff plate of automobiles, and home electric appliances such as a case of smart phone.

(3) Silver Mirror Film-Forming Liquid A silver mirror film-forming liquid includes a silver mirror liquid containing ammonia silver nitrate and a reducing liquid containing an aldehyde and a siloxane.

In an embodiment, for example, the silver mirror liquid may contain a silver main liquid that is a mixture of water, silver nitrate, and ammonium hydroxide and a silver sub-liquid that is a mixture of water, caustic soda, and ammonium hydroxide.

In an embodiment, for example, the reducing liquid may be a mixture of water, a saccharide, hydrochloric acid, and a siloxane.

The siloxane is produced by hydrolysis of a silane compound having an alkoxy group. Examples of the alkoxy group include vinyl group, epoxy group, styryl group, methacrylic group, acrylic group, amino group, ureido group, mercapto group, sulfide group, isocyanate group, methoxy group, and ethoxy group. Examples of the silane compound having an alkoxy group include tetraethyl orthosilicate (TEOS), tetramethyl orthosilicate (TMOS), vinyltrimethoxysilane, vinyltriethoxysilane, 2-(3,4-epoxycyclohexyl)ethyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-methacryloxypropylmethyldimethoxysilane, 3-methacryloxypropyltrimethoxysilane, 3-acryloxypropyltrimethoxysilane, 3-chloropropyltrimethoxysilane, 3-aminopropyltriethoxysilane, 3-aminopropyltrimethoxysilane, N-2-(aminoethyl)-3-aminopropyltrimethoxysilane, N-2-(aminoethyl)-3-aminopropylmethyldimethoxysilane, N-phenyl-3-aminopropyltrimethoxysilane, 3-mercaptopropyltrimethoxysilane, and 3-isocyanatopropyltriethoxysilane.

<Action>

(A) During formation of the silver mirror film from the silver particles, the interparticle silicon particles formed from a siloxane enter spaces between the silver particles. The presence of the interparticle silicon particles prevent migration of the silver particles and aggregation owing thereto.

(B) During formation of the silver mirror film, the surface silicon particles formed from the siloxane are to be present on surfaces of the silver particles so as to at least partially cover the surfaces. This suppresses migration of the silver particles and aggregation owing thereto.

(4) Method for Producing Reducing Liquid for Silver Mirror Film-Forming Liquid

In a method for producing the reducing liquid containing an aldehyde and a siloxane that is to be mixed with the silver mirror liquid containing ammonia silver nitrate, a solution of 1 mol/L tetraethyl orthosilicate is added in an amount of 1.5 mL to 7.5 mL relative to 5 mL of a reducing liquid containing 0.085 to 0.258 mol/L aldehyde. Thus, the reducing liquid is produced.

As to TEOS, when the solution of 1 mol/L TEOS is added in an amount of 1.5 mL to 7.5 mL relative to 5 mL of the reducing liquid containing 0.085 to 0.258 mol/L aldehyde, a silver mirror film to be formed causes plasmon coloring.

<Action>

When the TEOS solution is added in the aforementioned amount, the silver mirror film to be formed causes plasmon coloring.

It is preferable that TEOS in a sol state that is obtained by a sol-gel process be mixed in the reducing liquid.

The present invention can improve the discoloration resistance of a silver mirror film. The present invention allows the silver mirror film to cause plasmon coloring without a sulfuration treatment, simultaneously with formation of the silver mirror film.

DETAILED DESCRIPTION

Figure 6:
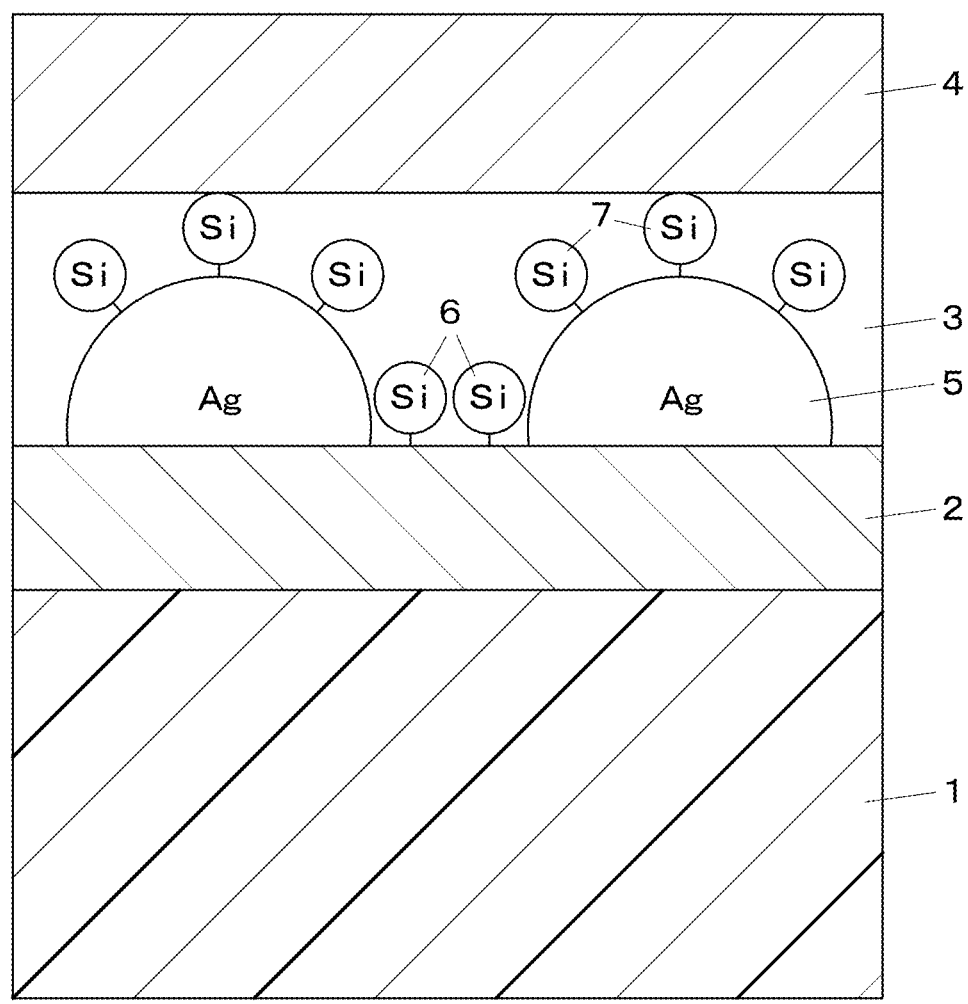
FIG. 6 is a partially cross-sectional view schematically illustrating a structure of a decorative article in examples.

As shown in FIG. 6, a decorative article includes a substrate 1, an undercoat layer 2 formed on the substrate 1 in contact with the substrate 1, a silver mirror film 3 formed on the undercoat layer 2 in contact with the undercoat layer 2, and a top coat layer 4 formed on the silver mirror film 3 in contact with the silver mirror film 3. The silver mirror film 3 includes a plurality of silver particles 5 arranged in a film surface direction, a plurality of interparticle silicon particles 6 between the silver particles 5, and a plurality of surface silicon particles on surfaces of the silver particles 5 so as to at least partially cover the surfaces. For example, the interparticle silicon particles and the surface silicon particles are present as $(Si_xO_{2y})_n \{x \geq 1, y \geq 1, \text{ and } n \geq 1\}$.

A silver mirror film-forming liquid includes a silver mirror liquid containing ammonia silver nitrate and a reducing liquid containing an aldehyde and a siloxane. The silver mirror liquid contains a silver main liquid that is a mixture of water, silver nitrate, and ammonium hydroxide and a silver sub-liquid that is a mixture of water, caustic soda, and ammonium hydroxide. The reducing liquid is a mixture of water, a saccharide, hydrochloric acid, and a siloxane. As the siloxane, TEOS is used. A solution of 1 mol/L TEOS is added in an amount of 1.5 mL to 7.5 mL relative to 5 mL of a reducing liquid containing 0.085 to 0.258 mol/L aldehyde. TEOS in a sol state that is obtained by a sol-gel process is mixed in the reducing liquid.

Examples

By a method described below, samples 1 to 4 of decorative articles each including a substrate, an undercoat layer, a silver mirror film, and a top coat layer were produced. As shown in Table 1, only the amounts of TEOS solution contained in a silver mirror film-forming liquid in production of a silver mirror film (4) and conditions of drying the silver mirror film in the samples 1 to 4 are different. In Comparative Example, the sample 1 containing no TEOS solution was used, and in Examples, the samples 2 to 4 containing the TEOS solution were used.

TABLE 1

Figure 1A:
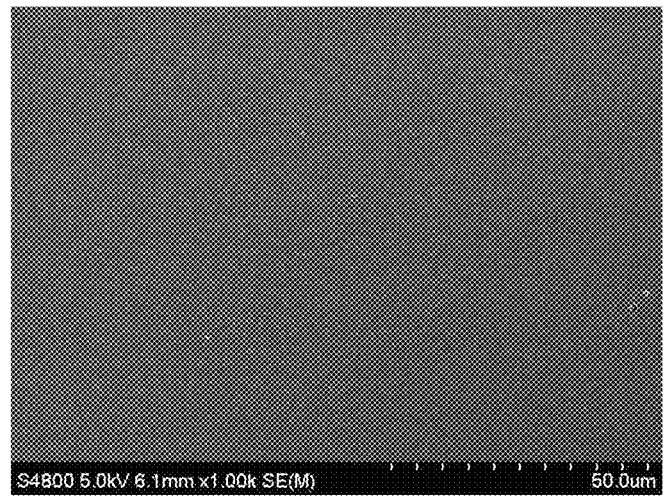
FIG. 1A is a SEM photograph of a sample 1 at a magnification of 1,000 times.
Figure 1B:
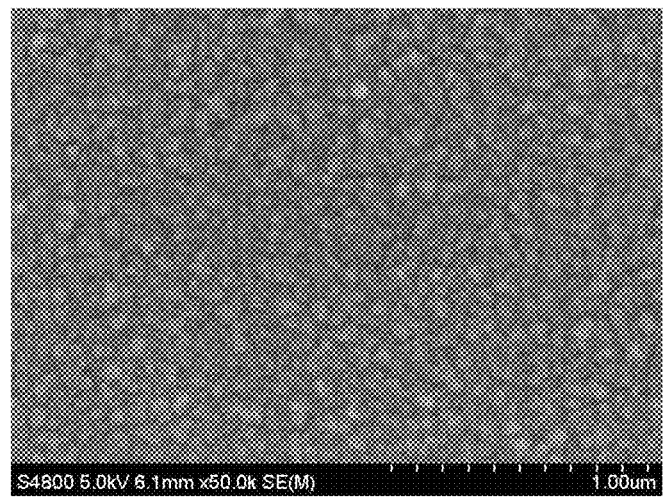
FIG. 1B is a SEM photograph of the sample 1 at a magnification of 50,000 times.
Figure 1C:
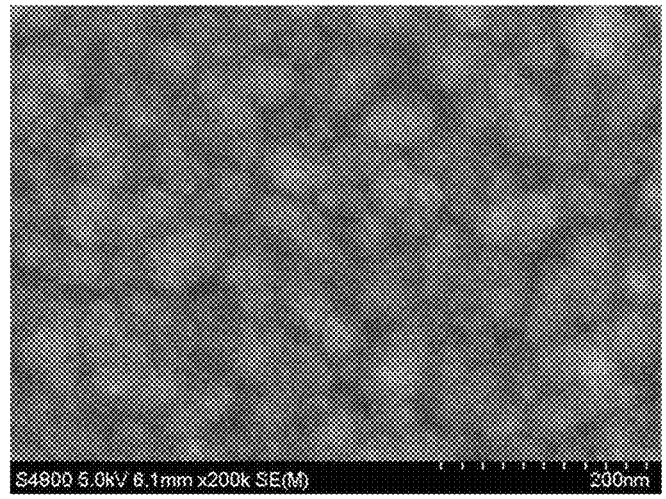
FIG. 1C is a SEM photograph of the sample 1 at a magnification of 200,000 times.
Figure 2A:
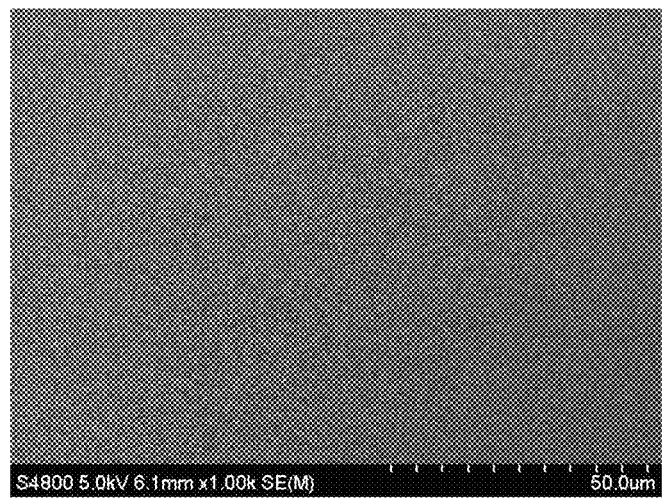
FIG. 2A is a SEM photograph of a sample 2 at a magnification of 1,000 times.
Figure 2B:
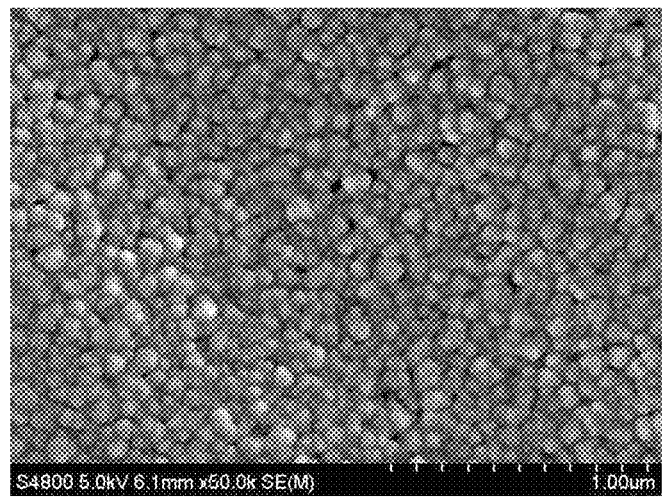
FIG. 2B is a SEM photograph of the sample 2 at a magnification of 50,000 times.
Figure 2C:
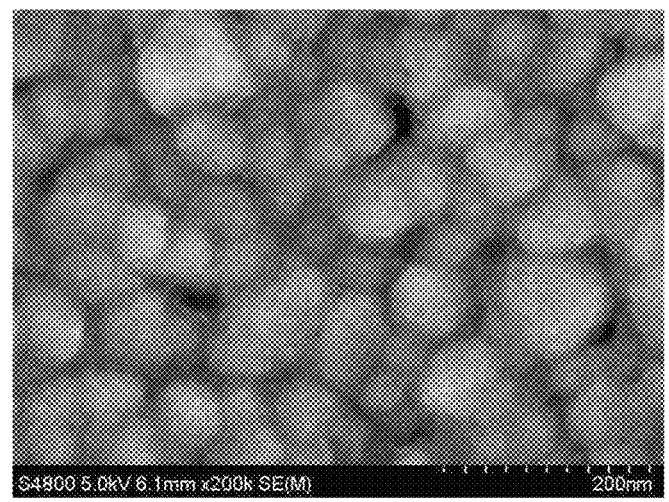
FIG. 2C is a SEM photograph of the sample 2 at a magnification of 200,000 times.
Figure 3A:
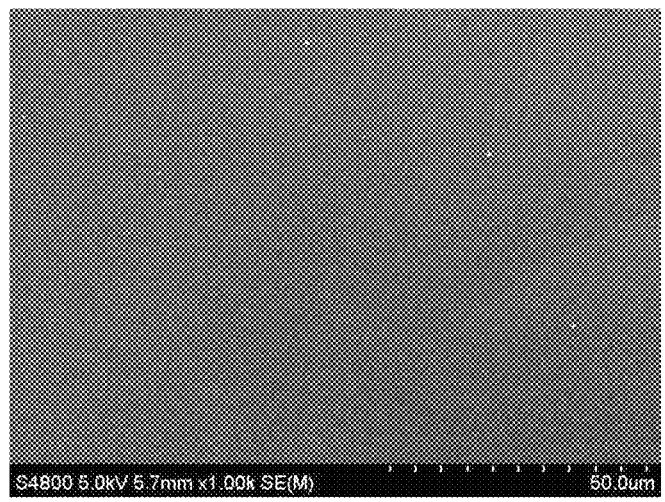
FIG. 3A is a SEM photograph of a sample 4 at a magnification of 1,000 times.
Figure 3B:
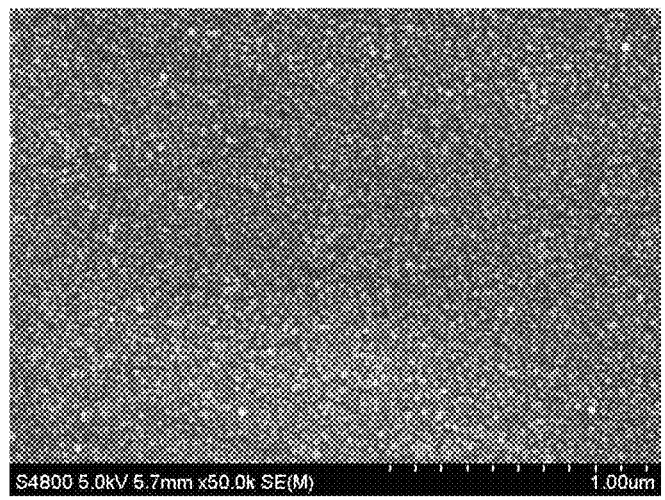
FIG. 3B is a SEM photograph of the sample 4 at a magnification of 50,000 times.
Figure 3C:
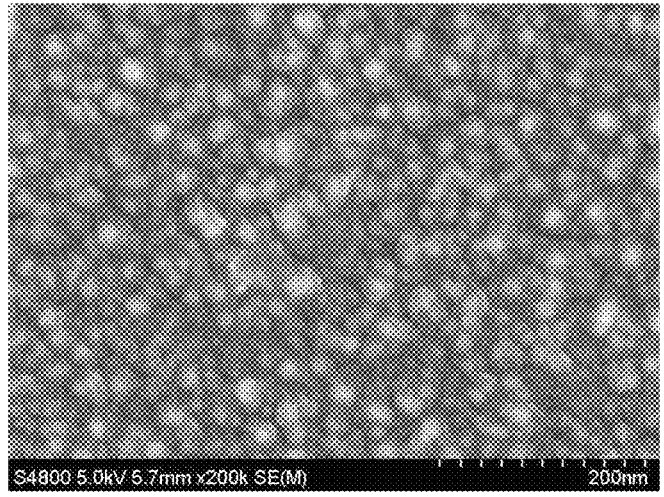
FIG. 3C is a SEM photograph of the sample 4 at a magnification of 200,000 times.

|  |  | Sample 1 | Sample 2 | Sample 3 | Sample 4 |
| --- | --- | --- | --- | --- | --- |
| Amount of TEOS solution | mL | 0 | 1.5 | 4.5 | 7.5 |
| Drying condition |  | 80° C. × 10 minutes | 80° C. × 12 hours | 80° C. × 12 hours | 100° C. × 1 hour + 80° C. × 12 hours |
| SEM surface observation |  | FIGS. 1A to 1C | FIGS. 2A to 2C | Not applicable | FIGS. 3A to 3C |
| Film thickness of silver mirror film | nm | 80 | 60 | Not applicable | 20 |
| Depth of detected Si | nm | Not detected | Only outermost surface | Not applicable | 15 |
| Resistance | Ω/□ | $7.227 \times 10^{-1}$ | $1.453 \times 10^{0}$ | $3.010 \times 10^{6}$ | $9.343 \times 10^{6}$ |
| Color |  | Silver | Yellow (lustered) | Slightly blue | Blue |
| L |  | 98.91 | 94.99 | 54.8 | 50.41 |
| a |  | −0.26 | −0.96 | −1.95 | −5.08 |
| b |  | 2.47 | 14.74 | 2.82 | −0.66 |
| Heat Resistance Test (FIG. 5) | Color difference after 83 hours | 3.01 | 2.79 | 1.08 | 0.49 |

(1) Substrate

As a substrate, a plate substrate made from an ABS resin and having a length of 100 mm, a width of 100 mm, and a thickness of 3.0 mm was used.

(2) Undercoat Layer

To the substrate made from an ABS resin, a liquid for undercoating was applied to form an undercoat layer.

As a material for the liquid for undercoating, the following major agent, curing agent, diluent, and leveling agent were used.

Major agent: Trade name "MFS undercoating major agent" product number "MFS-51" available from HYOUKAKEN Co., Ltd. (mixture of 40% of acrylic resin, 21.5% of toluene, 16.5% of xylene (mixed), and 22% of isobutyl acetate)

Curing agent: Trade name "MFS undercoating curing agent 21" product number "MFS-52AK21" available from HYOUKAKEN Co., Ltd. (mixture of 60% of isocyanate prepolymer and 40% of ethyl acetate)

Diluent: Trade name "MFS undercoating diluent" product number "MFS-53" available from HYOUKAKEN Co., Ltd. (mixture of 3.0% of toluene, 23.4% of xylene, 12.6% of ethylbenzene, 25 to 30% of butyl acetate, 5 to 10% of ethyl acetate, 1 to 5% of methyl isobutyl ketone, 10 to 15% of diacetone alcohol, and 14.0% of ethylene glycol monoethyl ether acetate)

Leveling agent: Trade name "MFS undercoating leveling agent" product number "MFS-58" available from HYOUKAKEN Co., Ltd. (mixture of 2% of polysiloxane and foaming preventing agent, 12% of 1,3,5-trimethylbenzene, 28% of 1,2,4-trimethylbenzene, 5% of 1,2,3-trimethylbenzene, 24% of ethylbenzene, 4% of xylene, 15% of diisobutyl ketone, and 3% of butyl glycolate)

The major agent, the curing agent, the diluent, and the leveling agent were mixed at a mass ratio of major agent:curing agent:diluent:leveling agent of 100:20:60 to 100:3 to 5, and the mixture was sprayed and applied to a surface of the substrate by a spray gun.

After the applying, the mixture was held in a constant temperature bath at 65° C. for 30 minutes, cured, and dried to form an undercoat layer having a film thickness of 15 to 25 m.

(3) Surface Adjustment

After being washed with ion exchange water, a surface adjusting liquid was sprayed to adjust a surface of the substrate or the undercoat layer, in order to promote deposition of silver and improve adhesiveness.

As a material for the surface adjusting liquid, the following surface adjustors A and B were used.

Surface adjustor A: Trade name "MFS surface adjustor A" product number "MFS-40A" available from HYOUKAKEN Co., Ltd., (aqueous solution of up to 10% of tin (II) chloride and of up to 5% of hydrochloric acid) diluted 15 times with ion exchange water (e.g., 10 mL of surface adjustor A and 140 mL of ion exchange water)

Surface adjustor B: Trade name "MFS surface adjustor B" product number "MFS-40B" available from HYOUKAKEN Co., Ltd., (aqueous solution of up to 1% of sodium salt) diluted 15 times with ion exchange water (e.g., 10 mL of surface adjustor B and 140 mL of ion exchange water)

The surface adjustors A and B were mixed at a mass ratio of surface adjustor A:surface adjustor B of 1:1 to produce the surface adjusting liquid, and the surface adjusting liquid was sprayed to a surface of the undercoat layer by a spray gun.

With the surface wet with the surface adjusting liquid, the surface was washed with ion exchange water to flush excess surface adjusting liquid.

(4) Silver Mirror Film

To the substrate (undercoat), a silver mirror film-forming liquid was applied (silver mirror coating) to form a silver mirror film.

As a material for the silver mirror film-forming liquid, the following silver main liquid, silver sub-liquid, reducing liquid, and TEOS solution were used.

Silver main liquid: Trade name "MFS silver main liquid" product number "MFS-10" available from HYOU-KAKEN Co., Ltd. (aqueous solution of 8.4% of silver nitrate and of up to 5% of ammonium hydroxide)

Silver sub-liquid: Trade name "MFS silver sub-liquid" product number "MFS-20" available from HYOU-KAKEN Co., Ltd. (aqueous solution of up to 10% of caustic soda and of up to 5% of ammonium hydroxide)

Reducing liquid: Trade name "MFS reductant" product number "MFS-30" available from HYOUKAKEN Co., Ltd. (aqueous solution of 5 to 15% of polysaccharide and of up to 5% of hydrochloric acid)

TEOS solution: aqueous solution of 1 mol/L TEOS

Specifically, 41.67 g of TEOS was dissolved in 30 mL of ethanol and 16 mL of ion exchange water, and the mixture was diluted by adding 154 mL of ion exchange water. To the mixture, 6 mL of 1M hydrochloric acid was added and sufficiently stirred to produce a TEOS solution in a sol state.

The silver main liquid was diluted 15 times with ion exchange water (e.g., 5 mL of silver main liquid and 70 mL of water), and the silver sub-liquid was diluted 15 times with ion exchange water (e.g., 5 mL of silver sub-liquid and 70 mL of water). The diluted solutions were mixed to produce a silver mirror liquid.

The reducing liquid was diluted 30 times with ion exchange water (e.g., 5 mL of the reducing liquid and 145 mL of water) to obtain a reducing liquid containing 0.085 to 0.258 mol/L aldehyde (diluted solution). Relative to 5 mL of the reducing liquid containing 0.085 to 0.258 mol/L aldehyde, the TEOS solution (concentration: 1 mol/L) in a sol state was added in an amount of 1.5 mL in the sample 2, in an amount of 4.5 mL in the sample 3, and in an amount of 7.5 mL in the sample 4, respectively, and was not added in the sample 1.

The silver mirror liquid and the reducing liquid (in the samples 2 to 4, containing the TEOS solution) were simultaneously sprayed by a double nozzle spray gun. As a result, the silver mirror liquid and the reducing liquid were mixed in the air and applied to a surface of the undercoat. On the undercoat, silver particles were deposited by a silver mirror reaction of the following reaction formula. As a result, a silver mirror film was formed.

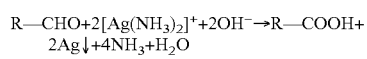
$$R\text{—}CHO+2[Ag(NH_3)_2]^++2OH^-\rightarrow R\text{—}COOH+2Ag\downarrow+4NH_3+H_2O$$

In formula, R—CHO is an aldehyde contained in the reducing liquid (the polysaccharide was hydrolyzed by hydrochloric acid to obtain a monosaccharide).

$[Ag(NH_3)_2]^+$ is an ammonia silver nitrate contained in the silver mirror liquid.

After formation of the silver mirror film, the silver mirror film was washed with ion exchange water.

(5) Corrosion Inhibition Treatment

In order to remove an unreacted substance of the silver mirror film and stabilize silver (prevent discoloration), a corrosion inhibiting liquid was sprayed to perform a corrosion inhibition treatment of the silver mirror film.

As a material for the corrosion inhibiting liquid, the following corrosion inhibitor was used.

Corrosion Inhibitor: Trade name "Ag corrosion inhibitor #50" product number "MFS-50" available from HYOU-KAKEN Co., Ltd. (mixed aqueous solution of 1 to 7% of sodium thiosulfate, less than 1% of acetic acid, and less than 1% of aluminum sulfate)

The corrosion inhibitor was diluted 50 times with ion exchange water (e.g., 10 mL of the corrosion inhibitor and 490 mL of water) to produce the corrosion inhibiting liquid. The corrosion inhibiting liquid was sprayed to a surface of the silver mirror film by a spray gun.

With the surface wet with the corrosion inhibiting liquid, the surface was washed with ion exchange water to flush excess corrosion inhibiting liquid.

The silver mirror film was held and dried in a constant temperature bath under a drying condition shown in Table 1.

(6) Top Coat Layer

To the silver mirror film after the corrosion inhibition treatment, a top coating liquid was applied to form a top coat.

As materials for the top coating liquid, the following major agent, curing agent, and diluent were used.

Major agent: Trade name "MFS top coating Special major agent (Clear)" product number "MFS-61-2" available from HYOUKAKEN Co., Ltd. (mixture of 33% of acrylic resin, 25.1% of xylene (mixed), 25.1% of ethylbenzene, 10 to 15% of n-butyl alcohol, and 5 to 10% of isobutyl alcohol)

Curing agent: Trade name "MFS top coating Special curing agent" product number "MFS-62-2" available from HYOUKAKEN Co., Ltd. (mixture of 10.7% of xylene, 10.7% of ethylbenzene, 25 to 30% of isopropyl alcohol, and 1 to 5% of n-butyl alcohol)

Diluent: Trade name "MFS top coating Special diluent" product number "MFS-63-2" available from HYOU-KAKEN Co., Ltd. (mixture of 30% of toluene, 25% of xylene, 25% of ethylbenzene, 5 to 10% of methoxybutyl acetate, and 10 to 15% of propylene glycol monomethyl ether acetate)

The major agent, the curing agent, and the diluent were mixed at a mass ratio of major agent:curingagent:diluent of 100:20:60 to 80, and the mixture was sprayed and applied to a surface of the silver mirror film by a spray gun.

After the applying, the mixture was held in a constant temperature bath at 65° C. for 30 minutes, cured, and dried to form the top coat layer having a film thickness of 15 to 25 μm.

As described above, the samples 1 to 4 were produced. After the corrosion inhibition treatment (5) (before formation of the top coat layer), the following observation, analysis, test, and the like were performed.

<1> SEM Surface Observation

Surfaces of the silver mirror films of the samples 1, 2, and 4 were observed by SEM (scanning electron microscope).

The silver particles in the sample 2 (FIGS. 2A to 2C) were larger, and the silver particles in the sample 4 (FIGS. 3A to 3C) were smaller as compared with those in the sample 1 (FIGS. 1A to 1C).

<2> XPS Analysis

By XPS (X-ray photoelectron spectroscopy), elements (particularly Ag and Si) present under the surfaces of the silver mirror films of the samples 1, 2, and 4 were analyzed. Specifically, element analysis was performed every time when the silver mirror films were etched to a depth of 4.8 nm at an X-ray spot size of 400 μm and an etching rate of 0.16 nm/second for 30 seconds. The total etching depth was about 144 nm (obtained by etching to a depth of 4.8 nm 30 times). The etching depth is a value in terms of $Ta_2O_5$.

Figure 4A:
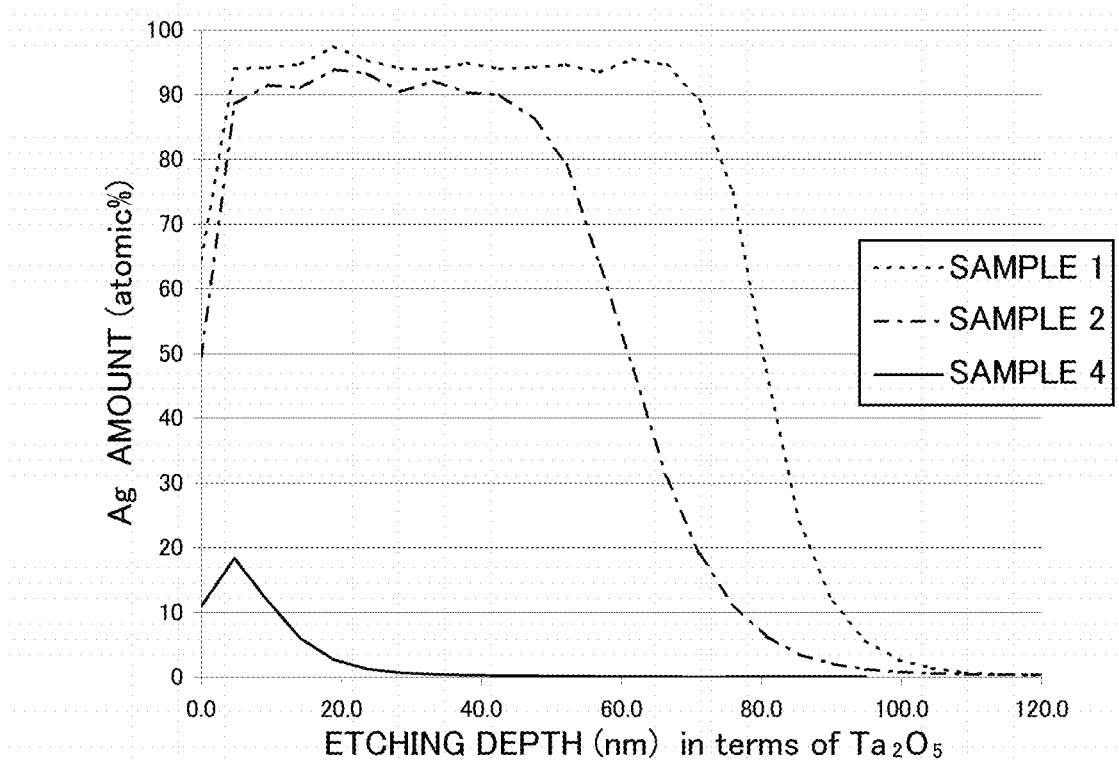
FIG. 4A is a graph illustrating Ag analysis results of the samples 1, 2, and 4 by XPS.

As shown in FIG. 4A and Table 1, the etching depth where the Ag amount was mainly detected, that is, the film thickness of the silver mirror film in the sample 1, 2, or 4 was about 80 nm, about 60 nm, or about 20 nm, respectively. As the amount of the TEOS solution added is larger, the thickness is smaller.

Figure 4B:
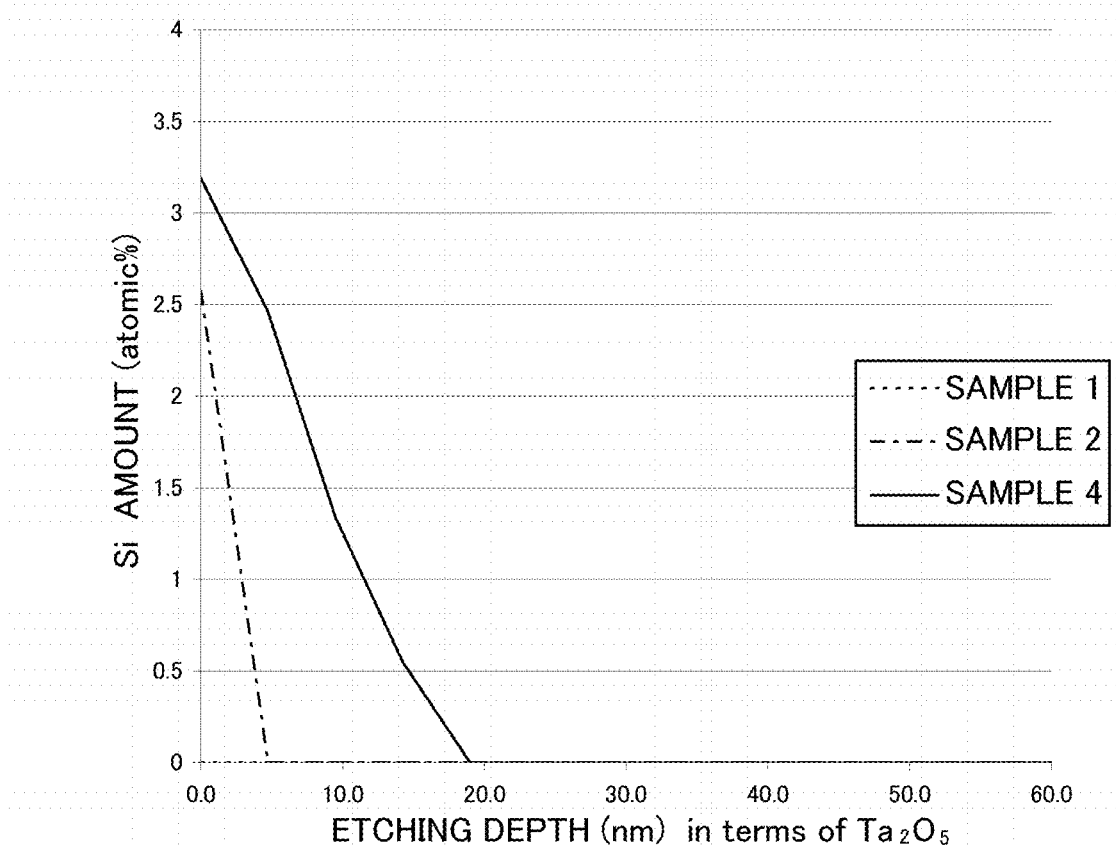
FIG. 4B is a graph illustrating Si analysis results of the samples 1, 2, and 4 by XPS.

As shown in FIG. 4B and Table 1, the etching depth where the Si amount was detected in the sample 1, 2, or 4 was 0 nm, only several nanometers of the outermost surface, or about 15 nm, respectively. An etching depth in the sample 4 of about 15 nm is close to a film thickness of the silver mirror film of about 20 nm. This shows that Si is incorporated into the silver mirror film.

<3> Electric Resistance

In a case of $1.0×10^4 Ω/□$ or less, the electric resistances of the silver mirror films of the samples 1 to 4 were measured by a four-terminal four-probe method in accordance with JIS-K7194. In a case of $1.0×10^4 Ω/□$ or more, the electric resistances of those were measured by a double-ring probe method in accordance with JIS-K6911. The measurement results are shown in Table 1.

As the amount of the TEOS solution added is larger, the electric resistance of the silver mirror film is higher. It is considered that this is because the amount of a plurality of interparticle silicon particles derived from the TEOS solution and present between adjacent silver particles is increased and the adjacent silver particles are hardly brought into contact with each other.

<4> Color

The colors of the silver mirror films of the samples 1 to 4 were visually observed. As shown in Table 1, as the amount of the TEOS solution added is larger, the color of the silver mirror film is changed from silver to yellow and to blue. This suggests that in the samples 2 to 4, plasmon resonance occurs between the silver particles and visible light having a specific wavelength at an interface between the silver particles and the silicon particles (film) and plasmon coloring is caused.

The Lab chromaticities of the samples 1 to 4 were measured by a color difference meter. The measurement results are shown in Table 1.

<5> Heat Resistance Test

Figure 5:
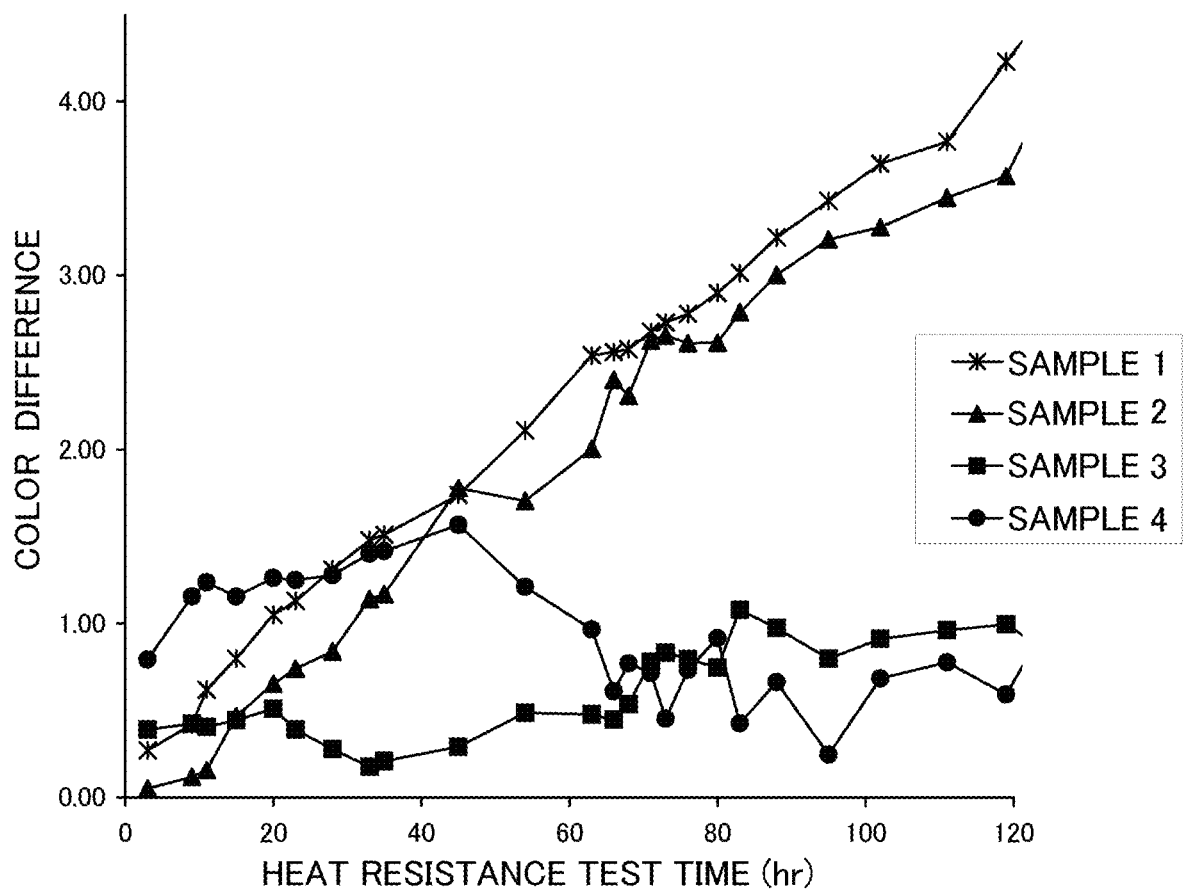
FIG. 5 is a graph illustrating results of heat resistance test (change of color difference with time) of the samples 1 to 4.

The samples 1 to 4 were held in a constant temperature bath at 80° C. for 120 hours, and subjected to a heat resistance test of silver mirror film. A color difference (ΔE) between the chromaticity before the test and that after a predetermined period of time was examined. FIG. 5 shows the change of color difference with time. In Table 1, the color difference after 83 hours is shown.

As the amount of the TEOS solution added is larger, the heat resistance and discoloration resistance of the silver mirror film are higher. It is considered that this is because the amount of a plurality of interparticle silicon particles derived from the TEOS solution and present between adjacent silver particles is increased and the silver particles hardly migrate.

From the observation, analysis, test, and the like, the decorative articles in Examples (the samples 2 to 4) are considered to have a structure schematically illustrated in FIG. 6. The decorative articles include a substrate 1, an undercoat layer 2, a silver mirror film 3, and a top coat layer 4. The silver mirror film 3 includes a plurality of silver (Ag) particles 5 arranged in a film surface direction, a plurality of interparticle silicon particles 6 between the silver particles 5, and a plurality of surface silicon particles 7 on surfaces of the silver particles 5 so as to at least partially cover the surfaces. When the surface silicon particles 7 covers a substantially whole surface of the silver particles 5, the surface silicon particles may be present as a silicon film. The interparticle silicon particles 6 and the surface silicon particles 7 may be present as $(Si_xO_{2y})_n \{x≥1, y≥1, and n≥1\}$ (abbreviated as Si in FIG. 6).

The present invention is not limited to Examples described above, and the present invention can be embodied by various modifications without departing from the spirit of the present invention.

The invention claimed is:

1. A silver mirror film-forming liquid comprising a mixture of
    a silver mirror liquid containing ammonia silver nitrate and
    a reducing liquid containing a mixture of an aldehyde and a siloxane in a sol state obtained by a sol-gel process.

2. The silver mirror film-forming liquid according to claim 1, wherein
    the silver mirror liquid is a mixture of a silver main liquid that is a mixture of water, silver nitrate, and ammonium hydroxide and a silver sub-liquid that is a mixture of water, caustic soda, and ammonium hydroxide, and
    the reducing liquid is a mixture of water, a saccharide, hydrochloric acid, and a siloxane.

3. The silver mirror film-forming liquid according to claim 1, wherein the siloxane is derived from tetraethyl orthosilicate.

4. The silver mirror film-forming liquid according to claim 2, wherein the siloxane is derived from tetraethyl orthosilicate.

5. A method for producing a reducing liquid containing an aldehyde and a siloxane that is to be mixed with a silver mirror liquid containing ammonia silver nitrate to form a silver mirror film-forming liquid, the method comprising:
    providing a siloxane-containing solution obtained by a sol-gel process containing 1 mole of tetraethyl orthosilicate in a sol state per liter of solution,
    providing an aldehyde-containing solution containing 0.085 to 0.258 mole of aldehyde per liter of solution, and
    adding 1.5 mL to 7.5 mL of the siloxane-containing solution to 5 mL of the aldehyde-containing solution and mixing the siloxane-containing solution and the aldehyde-containing solution.

* * * * *